US011048002B1

United States Patent
Mao et al.

(10) Patent No.: US 11,048,002 B1
(45) Date of Patent: Jun. 29, 2021

(54) VISUALIZATION SYSTEM FOR SIMULATING EXCAVATION OF FLUID-STRUCTURE INTERACTION TUNNEL

(71) Applicant: INSTITUTE OF GEOLOGY AND GEOPHYSICS, CHINESE ACADEMY OF SCIENCES, Beijing (CN)

(72) Inventors: Tianqiao Mao, Beijing (CN); Xiao Li, Beijing (CN); Shouding Li, Beijing (CN); Zhaobin Zhang, Beijing (CN); Jianming He, Beijing (CN); Guanfang Li, Beijing (CN); Yanfang Wu, Beijing (CN); Pengfei He, Beijing (CN); Bo Zheng, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/195,763

(22) Filed: Mar. 9, 2021

(30) Foreign Application Priority Data

Jul. 1, 2020 (CN) .......................... 202010624592.X (51) Int. Cl.
*G01V 1/30* (2006.01)
*G06T 17/05* (2011.01)

(52) U.S. Cl.
CPC .............. *G01V 1/306* (2013.01); *G06T 17/05* (2013.01); *G06T 2207/10081* (2013.01); *G06T 2207/10104* (2013.01); *G06T 2207/30184* (2013.01)

(58) Field of Classification Search
CPC combination set(s) only.
See application file for complete search history.

(56) References Cited

FOREIGN PATENT DOCUMENTS

| CN | 102589909 A | 7/2012 |
|---|---|---|
| CN | 202420884 U | 9/2012 |

(Continued)

OTHER PUBLICATIONS

Kulenkampff et al., "Quantitative experimental monitoring of molecular diffusion in clay with positron emission tomography", Mar. 18, 2016, Journal Solid Earth (Year: 2016).*

*Primary Examiner* — Zhiyu Lu
(74) *Attorney, Agent, or Firm* — Bayramoglu Law Offices LLC (57) ABSTRACT

A visualization system for simulating excavation of a fluid-structure interaction tunnel includes a fluid-structure interaction tunnel model system, a tunnel model solution supply system, a detection system and an excavation system. The tunnel model solution supply system is configured to inject a nuclide solution to simulate a fluid pressure. The detection system is configured to detect a 3D deformation state of a tunnel surrounding rock and a 3D migration process of the nuclide solution. The excavation system is provided between the detection system and the tunnel model system to simulate tunnel excavation. During the tunnel excavation, a lifting device in the excavation system controls a drilling device to ascend to a set height for operation. During 3D detection, the lifting device controls the drilling device to descend to an initial height to avoid affecting the detection of a detection device.

20 Claims, 3 Drawing Sheets

(56) References Cited

FOREIGN PATENT DOCUMENTS

| CN | 204575617 U | 8/2015 |
| CN | 207198017 U | 4/2018 |
| CN | 110441159 A | 11/2019 |
| CN | 111337651 A | 6/2020 |

* cited by examiner

VISUALIZATION SYSTEM FOR SIMULATING EXCAVATION OF FLUID-STRUCTURE INTERACTION TUNNEL

CROSS REFERENCE TO THE RELATED APPLICATIONS

This application is based upon and claims priority to Chinese Patent Application No. 202010624592.X, filed on Jul. 1, 2020, the entire contents of which are incorporated herein by reference.

TECHNICAL FIELD

The present invention belongs to the technical field of tunnel engineering, and specifically relates to a visualization system for simulating excavation of a fluid-structure interaction tunnel.

BACKGROUND

The number of tunnels in the transportation network in China is increasing because of large-scale development of highways, railways and subways. Moreover, the geological environment of tunnels under construction is becoming increasingly complex. The excavation of karst tunnels for the construction of tunnel projects, such as highways and railways will inevitably undergo soluble rock dissolution where these karst tunnels are situated. Major geological disasters, such as water burst and water inrush often occur as a result. Water inrush is likely to cause personal injury, death and substantial economic losses due to its large water volume, suddenness and strong destructiveness. It of course has a significant impact on the excavation and subsequent operation of the tunnel. Hence, the study of excavation and water inrush of a fluid-structure interaction tunnel has significant implications for tunnel construction in China.

During tunnel excavation, the setting of each of the parameters, including the rotational speed, the advance rate and the torque of the cutter head will produce different stresses on the surrounding rock of the fluid-structure interaction tunnel. During the operation of these tunnels, the construction stress will cause fractures in the surrounding rock of the karst tunnel to propagate and develop, thereby forming a water-conducting fracture zone in the surrounding rock. When the fracture zone develops into an aquifer, water in the aquifer will rush to the worked-out area along the fracture zone and induce a water inrush disaster. Human casualties and engineering losses result. In the prior art, water inrush tests are typically performed through manual excavation or through a model with an excavation channel. Neither method can simulate real tunnel excavation details and the migration of seeping and inrushing water, and fail to realize visible three-dimensional (3D) process monitoring. Therefore, these methods cannot fully explore the causes and control factors associated with the excavation and water inrush disasters in the surrounding rock of the tunnel, and thus cannot obtain scientific and accurate simulated test data.

SUMMARY

In order to solve the above-mentioned problem that the simulation test in the prior art cannot realize visible monitoring of the excavation and fluid migration process of the fluid-structure interaction tunnel, the present invention provides a visualization system for simulating excavation of a fluid-structure interaction tunnel. The visualization system includes a fluid-structure interaction tunnel model system, a tunnel model solution supply system, a detection system and an excavation system. The tunnel model solution supply system is provided above the fluid-structure interaction tunnel model system, and is configured to inject a nuclide solution to simulate a fluid pressure on a tunnel model. The detection system includes a computerized tomography (CT) ray system, a CT detection system, a first positron emission tomography (PET) detector and a second PET detector. The CT ray system and the CT detection system are provided on two sides of the fluid-structure interaction tunnel model system, respectively, and are configured to detect a 3D deformation state of a surrounding rock of a tunnel. The first PET detector and the second PET detector are provided on the other two sides of the fluid-structure interaction tunnel model system, respectively, and are configured to detect a 3D migration state of the nuclide solution in the tunnel model. The excavation system is provided between the CT ray system and the fluid-structure interaction tunnel model system to simulate excavation of the tunnel model. The excavation system includes a drilling device, a moving device, a carrying device and a lifting device. The moving device is connected to the drilling device through a guide rail slider, and is configured to drive the drilling device to approach or move away from the fluid-structure interaction tunnel model system. The lifting device is provided to be movable relative to the carrying device, and is configured to drive the carrying device, the moving device and the drilling device to ascend or descend.

In some preferred embodiments, the fluid-structure interaction tunnel model system includes a fluid-structure interaction tunnel model receiving device and a loading device. The loading device is fixedly provided on a carrying structure on the fluid-structure interaction tunnel model receiving device, and is configured to apply a load to the tunnel model to simulate an overburden stress on the tunnel model in a real environment. The fluid-structure interaction tunnel model receiving device is provided with two through holes adapted to the drilling device for drilling of the drilling device.

In some preferred embodiments, a pressure-bearing guide plate and a seepage permeable plate are further provided between the loading device and the tunnel model. The seepage permeable plate is provided beneath the pressure-bearing guide plate, and is configured for allowing uniform seepage of the nuclide solution injected into the pressure-bearing guide plate.

The pressure-bearing guide plate includes a plate-shaped body, a guide hole and guide grooves. The guide hole is provided through the center of the plate-shaped body. The guide grooves are provided on the bottom surface of the plate-shaped body to guide the nuclide solution injected into the guide hole.

The guide grooves include a circumferential guide groove and a radial guide groove. The circumferential guide groove is provided on the peripheral side of the guide hole. The radial guide groove is provided between the circumferential guide groove and the guide hole, and is configured to establish a fluid communication between the circumferential guide groove and the guide hole.

In some preferred embodiments, the tunnel model solution supply system includes a PET nuclide solution injection pump, a PET nuclide solution storage vessel and a PET nuclide solution injection tube. The PET nuclide solution injection pump and the PET nuclide solution storage vessel are provided on the carrying structure. The PET nuclide solution injection tube is driven by the PET nuclide solution injection pump to deliver the nuclide solution into the tunnel model.

In some preferred embodiments, the PET detection system further includes a first PET detector moving device, a first PET detector supporting device, a second PET detector moving device and a second PET detector supporting device.

The first PET detector and the second PET detector are fixed to the first PET detector moving device and the second PET detector moving device, respectively. The first PET detector moving device and the second PET detector moving device are connected to the first PET detector supporting device and the second PET detector supporting device through a guide rail slider, respectively.

The first PET detector moving device and the second PET detector moving device are configured to respectively drive the first PET detector and the second PET detector to approach or move away from the fluid-structure interaction tunnel model system.

In some preferred embodiments, the drilling device includes a drilling driving device, a drilling cutter head, an outer chamber, a screw conveyor shaft and a pressure sensor. The drilling cutter head and the outer chamber are sequentially sleeved outside the screw conveyor shaft.

The pressure sensor is provided at one end of the screw conveyor shaft away from the drilling driving device to monitor a thrust force of drilling in real time. A power output end of the drilling driving device is fixedly connected to the screw conveyor shaft to control a drilling process.

In some preferred embodiments, the moving device includes a moving driving device, a transmission device and a transmission screw. A power output end of the moving driving device is fixedly connected to a power input end of the transmission device. A power input end of the transmission screw is fixedly connected to a power output end of the transmission device. One end of the transmission screw away from the moving driving device is provided on the carrying device through a screw support structure. The moving device drives the drilling device to advance or retreat through the transmission screw.

In some preferred embodiments, the lifting device is a hydraulic prop.

In some preferred embodiments, the visualization system further includes a rotary carrying device. The rotary carrying device includes a rotating device and a carrying device. The rotating device is provided above the carrying device, and is configured to carry and drive the fluid-structure interaction tunnel model system to rotate.

In some preferred embodiments, the rotating device is a rotating table.

The present invention has the following advantages.

1) The present invention realizes visible monitoring of the deformation and failure process of the surrounding rock and the dynamic migration process of the seepage fluid during tunnel excavation to acquire reliable simulation test data.

2) The present invention studies the seepage characteristics of the surrounding rock that is deformed under the action of confined water to completely restore the actual engineering background, which provides more accurate test data for the study on the mechanism of water inrush in the tunnel.

3) The actual stress state of the tunnel surrounding rock is fully simulated through the tunnel model solution supply system to maximally restore the underground seepage environment of the tunnel surrounding rock (soil). The visualization system of the present invention can be used to simulate water inrush in the tunnel to realistically reflect the catastrophic process while saving substantial costs, manpower and material resources, and thus has the advantages of low test cost, short time period and convenient operation. The present invention realistically and accurately reproduces the catastrophic evolution process of water and mud inrush events to obtain the test result that is closer to the actual project than numerical simulation, thereby visually demonstrating the stress characteristics and deformation law of the surrounding rock, which lays a foundation for studying the mechanism of water and mud inrush disasters.

4) In the prior art, water inrush tests are typically performed through manual excavation or directly through a model with an excavation channel to acquire the simulation test data. These two methods cannot realistically realize the visible simulation test of tunnel excavation and water inrush, and cannot fully explore the evolving causes and control factors associated with the excavation and water inrush of the tunnel surrounding rock. Through the cooperation between the detection system, the tunnel simulation solution supply system and the excavation system, the present invention reveals the internal mechanism of water inrush disasters in the fluid-structure interaction tunnel, and provides reliable test data for preventing water inrush and predicting the precursor of water inrush in the fluid-structure interaction tunnel.

BRIEF DESCRIPTION OF THE DRAWINGS

Other features, objectives and advantages of the present invention will become more apparent upon reading the detailed description of the non-restrictive embodiments with reference to the drawings.

REFERENCE NUMERALS

100. fluid-structure interaction tunnel model system; 110. tunnel model box; 120. carrying structure; 130. normal cylinder; 140. connecting plate; 150. pressure-bearing guide plate; 151. guide hole; 152. circumferential guide groove; 153. radial guide groove; 154. plate-shaped body; 160. seepage permeable plate; 170. water collection tank; 200. excavation system; 210. drilling device; 220. moving device; 230. carrying device; 240. lifting device; 250. excavation base; 300. high-energy accelerator CT detection system; 310. ray source; 311. ray source table; 312. ray source rack; 313. ray source base; 320. linear array detector; 321. planar array detector; 322. detector rack; 323. detector table; 324. detector lifting device; 325. detector base; 400. PET detection system; 410. PET detector; 420. PET detector moving device; 430. PET detector supporting device; 500. tunnel model solution supply system; 510. PET nuclide solution injection pump; 520. PET nuclide solution injection tube; and 530. PET nuclide solution storage vessel.

DETAILED DESCRIPTION OF THE EMBODIMENTS

The preferred implementations of the present invention are described below with reference to the accompanying drawings. Those skilled in the art should understand that the implementations herein are merely intended to explain the technical principles of the present invention, rather than to limit the protection scope of the present invention.

The present invention provides a visualization system for simulating the excavation of a fluid-structure interaction tunnel. The visualization system includes a fluid-structure interaction tunnel model system, a tunnel model solution supply system, a detection system and an excavation system. The tunnel model solution supply system is provided above the fluid-structure interaction tunnel model system, and is configured to inject a nuclide solution to simulate a fluid pressure on a tunnel model. The detection system includes a computerized tomography (CT) ray system, a CT detection system, a first positron emission tomography (PET) detector and a second PET detector. The CT ray system and the CT detection system are provided on two sides of the fluid-structure interaction tunnel model system, respectively, and are configured to detect a three-dimensional (3D) deformation state of a surrounding rock of a tunnel. The first PET detector and the second PET detector are provided on the other two sides of the fluid-structure interaction tunnel model system, respectively, and are configured to detect a 3D migration state of the nuclide solution in the tunnel model. The excavation system is provided between the CT ray system and the fluid-structure interaction tunnel model system to simulate excavation of the tunnel model. The excavation system includes a drilling device, a moving device, a carrying device and a lifting device. The moving device is connected to the drilling device through a guide rail slider, and is configured to drive the drilling device to approach or move away from the fluid-structure interaction tunnel model system. The lifting device is provided to be movable relative to the carrying device, and is configured to drive the carrying device, the moving device and the drilling device to ascend or descend.

The present invention is described in more detail below with reference to the drawings and specific embodiments.

Figure 1:
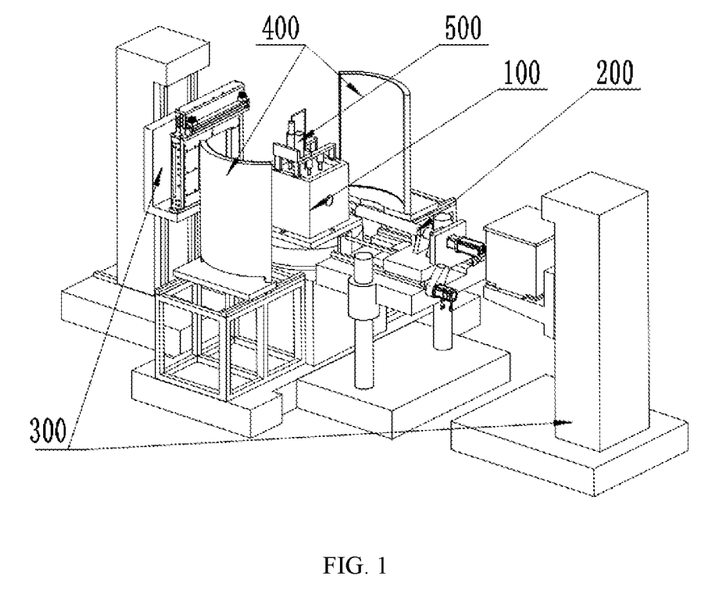
FIG. 1 is a three-dimensional view of the structure according to a specific embodiment of the present invention.

FIG. 1 is a three-dimensional view illustrating the structure of a visualization system according to a specific embodiment of the present invention. The visualization system includes the fluid-structure interaction tunnel model system 100, the tunnel model solution supply system 500, the high-energy accelerator CT detection system 300, the PET detection system 400 and the excavation system 200. The tunnel model solution supply system 500 is provided above the fluid-structure interaction tunnel model system 100, and is configured to inject a nuclide solution to simulate a fluid pressure on a tunnel model. The high-energy accelerator CT detection system 300 and the PET detection system 400 are provided on different sides of the tunnel model, and are configured to detect a 3D deformation state of a surrounding rock inside the tunnel model and a migration process of the nuclide solution inside the surrounding rock, respectively. The excavation system is provided between a ray system in the high-energy accelerator CT detection system 300 and the tunnel model to realistically simulate the excavation of the tunnel model. The tunnel model is excavated through the excavation system to acquire a real deformation process of the tunnel surrounding rock caused by a cutter head. The detection system is configured to detect the development and propagation of fractures in the deformation process of the tunnel surrounding rock under different excavation parameters to provide reliable test data for real excavation.

Further, the visualization system includes a rotary carrying device. The rotary carrying device is provided beneath the tunnel model, and is configured to carry and drive the tunnel model to rotate. Through the rotation of the rotary carrying device, the detection system acquires a comprehensive 3D shape of the surrounding rock in a deformation state inside the tunnel model.

Further, the high-energy accelerator CT detection system 300 includes a CT ray system and a CT detection system. The CT ray system and the CT detection system are provided on two sides of the fluid-structure interaction tunnel model system, respectively, to detect a 3D deformation state of the surrounding rock of the tunnel. The PET detection system 400 includes a first PET detector and a second PET detector. The first PET detector and the second PET detector are provided on the other two sides of the fluid-structure interaction tunnel model system, respectively, to detect a 3D migration state of the nuclide solution in the tunnel model, so as to further acquire a propagation state of the fractures in the surrounding rock inside the tunnel model. The excavation system includes a drilling device, a moving device, a carrying device and a lifting device. The moving device is connected to the drilling device through a guide rail slider, and is configured to drive the drilling device to approach or move away from the fluid-structure interaction tunnel model system. The lifting device is provided to be movable relative to the carrying device, and is configured to drive the carrying device, the moving device and the drilling device to ascend or descend. When the tunnel model needs to be drilled, the drilling device is driven by the lifting device to ascend until the drilling cutter head is flush with a through hole that is preformed outside a tunnel model box to perform a drilling operation. When the tunnel model needs to be scanned and detected, the drilling device is driven by the lifting device to descend to an initial position to avoid interfering with the scanning of the detection system. Then, the CT ray system and the CT detection system detect the 3D deformation state of the tunnel surrounding rock, so as to realize the visible monitoring of the tunnel model during the excavation process.

Figure 2:
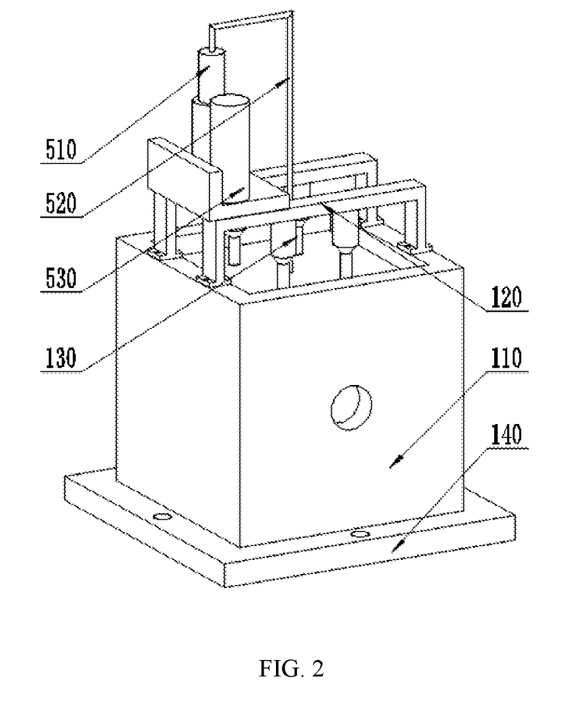
FIG. 2 is a three-dimensional view of the structure of a fluid-structure interaction tunnel model system and a tunnel model solution supply system shown in FIG. 1.

Further, as shown in FIG. 2, which is a three-dimensional view of the structure of the fluid-structure interaction tunnel model system and the tunnel model solution supply system shown in FIG. 1. The fluid-structure interaction tunnel model system includes a fluid-structure interaction tunnel model receiving device and a loading device. The loading device is fixedly provided on a carrying structure on the fluid-structure interaction tunnel model receiving device, and is configured to apply a load to the tunnel model to simulate an overburden stress on the tunnel under a real environment. Two sides of the fluid-structure interaction tunnel model receiving device along a drilling direction are provided with through holes adapted to the drilling device for drilling of the drilling device to facilitate simulating the excavation of the tunnel model in the tunnel model box to improve the efficiency of the simulation test. Further, the fluid-structure interaction tunnel model receiving device includes the tunnel model box 110 and the carrying structure 120. The tunnel model box is a cubic box with an upper opening, and the upper opening is configured to apply a load to simulate an overburden pressure and supply a solution into the tunnel model. The carrying structure is fixed on the tunnel model box 110 to carry the loading device and the tunnel model solution supply system. The two sides of the tunnel model box 110 along the drilling direction of the excavation system are provided with through holes adapted to the drilling device. The tunnel model box is fixed to the rotary carrying device through the connecting plate 140. The loading device is the normal cylinders 130. In the present embodiment, a normal load is applied to the tunnel model inside the tunnel model box by the four evenly arranged normal cylinders to simulate the overburden pressure, so that the uniformity of the applied pressure is ensured. It should be noted that the present embodiment is only a preferred embodiment in which the number and position of the normal cylinders do not limit the scope of protection of the present invention, as long as the overburden pressure on the tunnel model inside the tunnel model box can be simulated. Therefore, other solutions will not be repeated herein.

Further, the tunnel model solution supply system includes the PET nuclide solution injection pump 510, the PET nuclide solution storage vessel 530 and the PET nuclide solution injection tube 520. The PET nuclide solution injection pump and the PET nuclide solution storage vessel are fixedly provided on the carrying structure through an L-shaped plate structure. The PET nuclide solution injection tube is driven by the PET nuclide solution injection pump to deliver the nuclide solution into the tunnel model, and is configured to simulate a seepage pressure or head pressure of the tunnel model. The specific pressure value may be adjusted accordingly according to the pressure setting of the injection pump to simulate a precise pressure. In addition, through the pressure adjustment of the injection pump, the migration of fluid inside the tunnel model can be adjusted to test the migration of fluid at different speeds under different pressures controlled by the injection pump.

Figure 3:
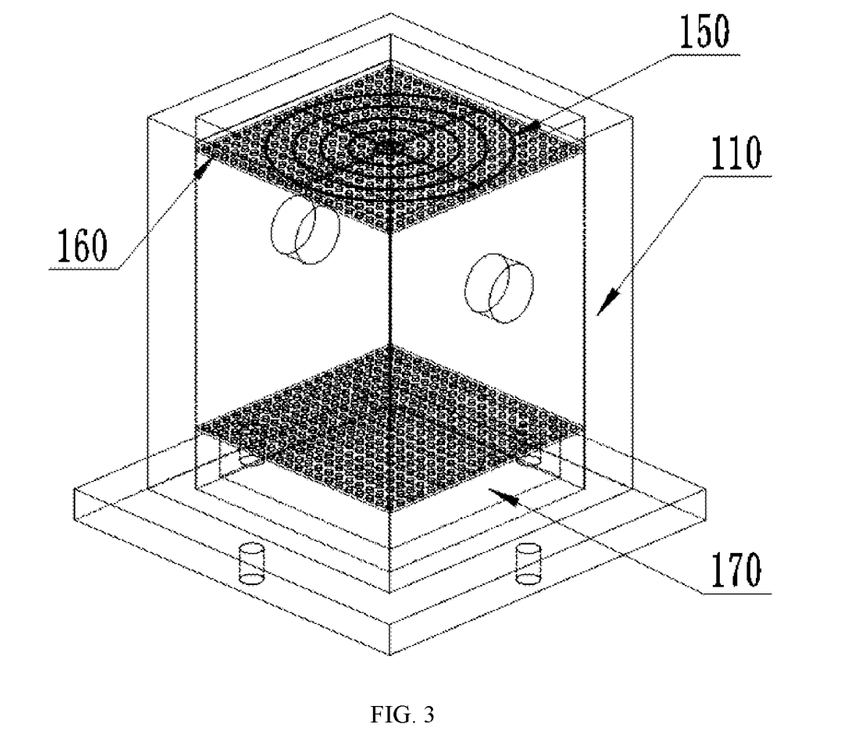
FIG. 3 is a partial perspective view of the fluid-structure interaction tunnel model system according to the present invention.

Further, as shown in FIG. 3, a partial perspective view of the fluid-structure interaction tunnel model system according to the present invention is shown. The fluid-structure interaction tunnel model system includes the tunnel model box 110. Two through holes are provided on two sides of the box body running through along an excavation direction. The pressure-bearing guide plate 150 and the seepage permeable plate 160 are provided above the tunnel model received in the box body. The upper part of the seepage permeable plate is provided beneath the pressure-bearing guide plate. A plurality of through holes are arranged in the seepage permeable plate and configured for allowing uniform seepage of the nuclide solution injected into the pressure guide plate. The through holes are arranged regularly or irregularly, as long as they can play a guiding role.

Further, the water collection tank 170 is provided under the tunnel model and configured to collect the solution flowing out of the tunnel model. Another seepage permeable plate is further provided between the water collection tank and the tunnel model to facilitate the collection of the seeping solution.

It should be noted that the configuration of the water collection tank is not limited to this solution. According to a test plan for seepage water inrush and water burst after excavation and different test water flows, the water collection tank may further be connected to the outside of the test device through a guide tube to facilitate the corresponding simulation test.

Figure 4:
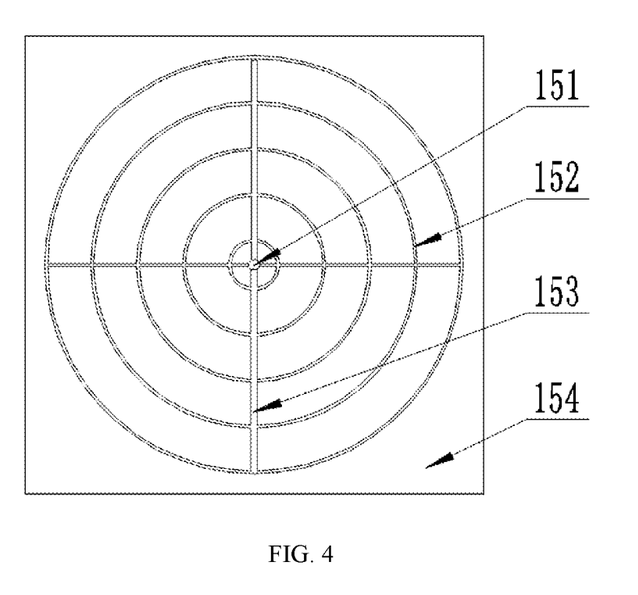
FIG. 4 is a bottom view of a pressure-bearing guide plate shown in FIG. 3.

Further, as shown in FIG. 4, which is a bottom view of a pressure-bearing guide plate shown in FIG. 3. The pressure-bearing guide plate includes the plate-shaped body 154, the guide hole 151 and guide grooves. The guide hole 151 is provided in the center of the plate-shaped body 154 and is configured to receive the solution injection tube. The guide grooves are in a fluid communication with the guide hole and provided on the peripheral side of the guide hole to realize the rapid and uniform distribution of the injected solution on the upper side of the tunnel model. Further, the guide grooves include the circumferential guide grooves 152 and the radial guide grooves 153. The circumferential guide grooves 152 are evenly distributed on the peripheral side of the guide hole. The radial guide grooves 153 are crisscross arranged between the circumferential guide grooves and the guide hole, and are configured to establish a fluid communication between the circumferential guide grooves and the guide hole. The concentric circumferential guide grooves and the radial guide grooves evenly bisecting the circumferential guide grooves permit the solution injected through the guide hole of the pressure-bearing guide plate to disperse quickly, evenly and regularly, thereby realizing the pressure and fluid seepage simulations of the fluid-structure interaction tunnel.

Figure 5:
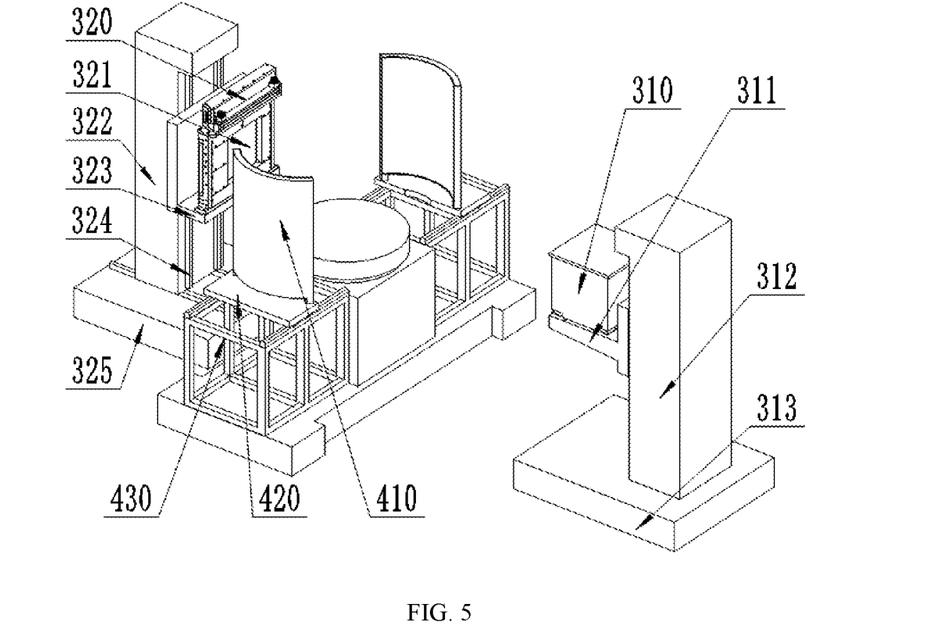
FIG. 5 is a three-dimensional view of the structure of a high-energy accelerator CT detection system and a PET detection system shown in FIG. 1.

FIG. 5 is a three-dimensional view of the structure of the high-energy accelerator CT detection system and the PET detection system shown in FIG. 1. The PET detection system includes the PET detector 410, the PET detector moving device 420 and the PET detector supporting device 430. The PET detector 410 is driven by the PET detector moving device 420 to approach or move away from the tunnel model box, so as to flexibly adjust the detection distance. The detector moving device 420 is provided on the PET detector supporting device 430 through a guide rail slider, and is positioned at the same height as the tunnel model box through the PET detector supporting device to ensure the detection effect.

Further, the PET detector includes a first PET detector and a second PET detector that are provided on two sides of the tunnel model box, respectively. The PET detector moving device includes a first PET detector moving device and a second PET detector moving device. The PET detector supporting device includes a first PET detector supporting device and a second PET detector supporting device. The corresponding PET detectors provided on the two sides of the tunnel model box accurately detect the migration of the seepage fluid in the tunnel model inside the tunnel model box. Through the seepage of the injected PET nuclide solution, the propagation and development of fractures in the tunnel surrounding rock caused by excavation are visually detected in three dimensions to acquire formation processes of the fractures at different excavation stages.

Further, a rotary carrying device is provided beneath the tunnel model box to cooperate with the detection system. The rotary carrying device includes a rotating device and a carrying device. The rotating device is provided above the carrying device, and is configured to carry and drive the fluid-structure interaction tunnel model system to rotate.

Further, the rotating device is a rotating table.

The high-energy accelerator CT detection system includes a CT ray system and a CT detection system that are provided on two sides of the fluid-structure interaction tunnel model system, respectively. The CT ray system includes the ray source 310, the ray source table 311, the ray source rack 312 and the ray source base 313. A ray source is provided on the ray source rack through the ray source table, and is driven by a corresponding power device to ascend and descend in an adjustable manner. The ray source rack is provided on the ground through the ray source base. The CT detection system includes the linear array detector 320, the planar array detector 321, the detector rack 322, the detector table 323, the detector lifting device 324 and the detector base 325. The linear array detector 320 and the planar array detector 321 are both provided on the detector rack 322 through the detector table 323, and are driven by a power device corresponding to the detector table to ascend and descend in an adjustable manner. The detector rack is provided on the ground through the detector base. The detector rack is provided opposite to the ray source to facilitate the 3D visible monitoring of the excavation shape of the tunnel model inside the tunnel model box and the fractures generated in the surrounding rock during the excavation process.

Further, the high-energy accelerator CT detection system further includes a CT detector vertical guide rail and a CT detector horizontal guide rail. The CT detector vertical guide rail is mounted on the inner side of the CT detector rack close to the tunnel model box to lift the detectors and adjust the height of the CT planar array detector and the CT linear array detector. The CT planar array detector and the CT linear array detector are provided on the detector table, and can be switched according to different needs to ensure optimal scanning quality. The linear array detector has a higher imaging precision and is configured to scan a certain zone of the test model to obtain the size information associated with structural features of the test model. The planar array detector has a larger field of view and thus can perform large-scale imaging on the test sample to obtain the 3D distribution of the fractures in the test sample.

In the present invention, the high-energy accelerator CT detection system realizes real-time detection of the tunnel excavation process to acquire parameters of different shapes in a loaded state, while realizing the simulation of multiple parameters in the same test according to the adjustment of different parameters such as fluid flow rate and pressure, thereby acquiring reliable parameter data, which provides a reliable theoretical basis for practical excavation.

In the present invention, PET detection is adopted because it is substantially safe. The nuclide required for PET detection is radioactive, but the nuclide used has a small amount and an extremely short half-life (ranging from 12 min to 120 min). Under the actions of a combination of physical attenuation and biological metabolism, the nuclide can only survive for a short time, and is thus safe and reliable.

In the present invention, through the rotary carrying system, the excavation of the tunnel model in a loaded state is scanned to obtain the tunnel drilling details and the formation, development and propagation states of the excavation-induced fractures in the tunnel surrounding rock. In this way, the CT imaging can fully reflect the structural state of the test sample being loaded, which is conducive to scientific research.

Figure 6:
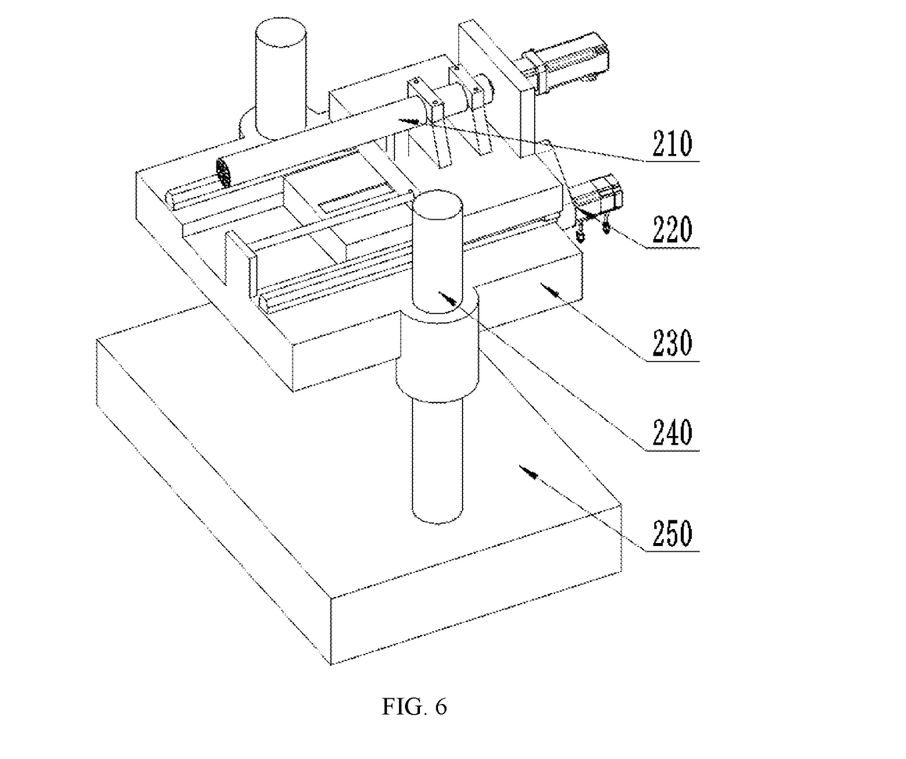
FIG. 6 is a three-dimensional view of the structure of an excavation system shown in FIG. 1.

Further, as shown in FIG. 6, which is a three-dimensional view of the structure of the excavation system shown in FIG. 1, the excavation system includes the drilling device 210, the moving device 220, the carrying device 230, the lifting device 240 and the excavation base 250. The moving device 220 drives the drilling device to advance or retreat by a screw passing through the drilling device 210 to perform drilling. The moving device 220 is fixedly provided on the carrying device 230. The drilling device 210 is connected to the carrying device 230 through a guide rail slider. The lifting device 240 is provided at a position close to a side of the carrying device 230 and is configured to control the overall carrying device to ascend and descend in an adjustable manner under the driving of a corresponding power device. The lifting device 240 is provided on the ground through the excavation base 250.

The moving device 220 includes a moving servomotor, a transmission screw and a transmission device, and is configured to control the drilling device to approach or move away from the tunnel model system to perform a corresponding drilling operation. The moving device is driven by the moving servomotor provided on a side of the carrying device away from the tunnel model. A power output end of the moving servomotor is fixedly connected to a power input end of the transmission device. A power input end of the transmission screw is fixedly connected to a power output end of the transmission device. The drilling device is controlled to advance or retreat by the forward and reverse rotation of the moving servomotor. An end of the transmission screw away from the moving driving device is provided on the carrying device through a screw support structure, and is configured to cooperate with the transmission device to support the transmission screw. The direction of the transmission screw is consistent with the drilling direction of the drilling device.

Further, the drilling device includes a drilling driving device, a drilling cutter head, an outer chamber, a screw conveyor shaft and a pressure sensor. The drilling cutter head is provided at an end of the screw conveyor shaft to drill the tunnel model. The drilling cutter head and the outer chamber are sequentially sleeved outside the screw conveyor shaft. The pressure sensor is provided at an end of the screw conveyor shaft away from the drilling driving device to monitor a thrust force of drilling in real time. A power output end of the drilling driving device is fixedly connected to the screw conveyor shaft to control a drilling process. The outer chamber is provided outside the screw conveyor shaft. During a drilling process, the outer chamber is filled with muck excavated by the drilling cutter head. The muck is transferred to the outer chamber through the screw conveyor shaft to ensure the normal operation of the drilling.

Further, the drilling cutter head is preferably a simulated cutter head of a shield tunneling machine.

In the present embodiment, the electrically-driven cutter head is selected to simulate excavation to lower the cost while facilitating the use and maintenance of the drilling device. When changing a cutting tool, the rotation of the cutter head can be stopped at a specified angle at any time. The rotation direction of the cutter head can be easily changed by changing a phase sequence.

Further, the drilling device further includes a temperature sensor, a wear sensor and a rotational speed sensor. The temperature sensor is configured to acquire temperature information of the drilling cutter head. The wear sensor is configured to acquire wear information of a hob on the cutter head. The rotational speed sensor is configured to acquire rotational speed information of the hob to further realistically simulate the actual construction, so that the test data acquired are more reliable.

Further, the lifting device is a hydraulic prop that is hydraulically controlled to ascend or descend. It should be noted that the lifting device may also be an electrically-controlled device, a chain drive control device or other types of control devices, as long as it can realize the lifting control. The present embodiment is a preferred embodiment, which does not limit the scope of protection of the present invention.

Further, a screw support structure may be additionally provided at an end of the transmission screw close to the transmission device. The transmission screw is carried by the two screw support structures provided at both ends of the transmission screw to further ensure the levelness of the transmission screw to ensure the drilling guidance of the drilling device.

It should be noted that the number and position of the transmission screw are flexibly set according to a specific test requirement, as long as the movement control of the drilling device can be realized. The setting of the transmission screw in the present embodiment does not limit the scope of protection of the present invention.

Further, the transmission device includes a first pulley and a second pulley. The first pulley is fixed at a power input end of the moving servomotor. The second pulley is fixed at an end of the transmission screw away from the tunnel model system. The first pulley and the second pulley form a synchronous belt drive through a belt. Further, a conveyor belt cover is provided outside the first pulley, the second pulley and the belt to protect the synchronous belt drive. In addition, the size of the first pulley and the second pulley is flexibly set according to a specific requirement, so as to adjust the advance rate of the drilling device. The synchronous belt is arranged to ensure an accurate transmission ratio and a compact structure, while facilitating maintenance and the flexible replacement of large and small pulleys of corresponding sizes.

Further, the transmission device may be a gear set, which specifically includes a driving gear, a first driven gear and a second driven gear. The first driven gear and the second driven gear separately mesh with the driving gear for transmission. The driving gear is fixed at the power output end of the moving servomotor. The transmission screw includes a first transmission screw and a second transmission screw. The first driven gear is fixed at an end of the first transmission screw away from the tunnel model system. The second driven gear is fixed at an end of the second transmission screw away from the tunnel model system. In the present embodiment, through the driving gear, the moving servomotor simultaneously controls the two transmission screws to advance the drilling device.

Further, the excavation device is provided with a muck chamber. The muck chamber is provided under the drilling device and is configured to receive muck drilled by the drilling device.

Further, the plate-shaped structure configured to carry the drilling device may be a mobile trolley, and the mobile trolley is configured to move on a preset track on the carrying device.

A method of operating the visualization system for simulating excavation of a fluid-structure interaction tunnel specifically includes the following steps:

S100: a normal load value, a fluid pressure, a drilling rotational speed and a moving speed of the drilling device of the visualization system are preset.

S200: a normal loading device is controlled to apply a normal load according to the normal load value to simulate a real overburden pressure on the tunnel model.

S300: the tunnel model solution supply system is controlled to inject a solution under the preset fluid pressure to simulate a fluid pressure on the tunnel model.

S400: a detection system is activated to acquire an initial 3D state of the fluid-structure interaction tunnel model.

S500: an excavation system is controlled to ascend until the drilling device thereon is flush with a through hole reserved on the tunnel model.

S600: the moving device is rotated forward at the preset moving speed to drive the excavation system to drill the tunnel model at the preset drilling rotational speed.

S700: the moving device is stopped when the excavation system drills a set distance, and the moving device is rotated reversely at the preset moving speed to drive the drilling device to exit the tunnel model. The excavation system is controlled to descend to an initial position, wherein the initial position does not interfere with the detection of the detection system.

S800: based on the detection of the detection system, a deformation state caused by a confining pressure and a migration state of seepage fluid inside the tunnel model are acquired, wherein the deformation state caused by the confining pressure is specifically a development and propagation state of fractures in the surrounding rock.

S900: S500 to S800 are cyclically executed until the fluid-structure interaction tunnel model is drilled through, the overall deformation state caused by the confining pressure inside the tunnel model is acquired through the high-energy accelerator CT detection system, and a 3D model of the migration of the seepage fluid is acquired through the PET detection system.

S1000: the fluid pressure supplied by the tunnel model solution supply system is adjusted incrementally. The detection system is controlled to detect in real time a propagation and evolution process of the fractures in the tunnel surrounding rock during a water inrush until a water inrush channel is completely formed to turn off the tunnel model solution supply system, and a corresponding fluid pressure when the water inrush occurs is acquired.

In the prior art, when the practical excavation process of the fluid-structure interaction tunnel encounters an underground river or a natural karst cave, a water partition wall must be built in the tunnel to block the underground river. When a karst cave is exposed to cause mud and water inrush accidents during construction, the large amount of water inflow will cause an interruption of the construction. The water inrush in the karst tunnel is easy to cause a debris flow, which contributes to long-term hazards to the operation of the tunnel. In the practical construction process of the tunnel, due to a lack of geological data, the excavation frequently encounters disasters associated with karst caves such as severe water inrushes, which will consequently cause a series of losses such as shutdowns. In recent years, the construction of hydraulic tunnels, railway tunnels and highway tunnels in southwest China has also encountered many disasters associated with karst caves to varying degrees, which even caused major accidents. For example, during the construction of the Huayingshan Tunnel on the Guang'an-Chongqing Expressway, water and mud inrushes occurred at many positions in a karst cave and caused two underground rivers to pour in. During the construction of the Yuanliangshan Tunnel on the Chongqing-Huaihua Railway, an extraordinarily serious water inrush occurred in a karst cave, which caused a significant impact on the construction. Therefore, it is of vital importance to simulate the water burst and water inrush in the karst tunnel during and after the excavation to acquire valuable test data.

An implementation of the present invention includes: (1) simulating the real excavation of a fluid-structure interaction tunnel, and setting parameters such as the rotational speed of the cutter head, the advance rate of the drilling device and the force applied by the cutter head on the tunnel model to realistically simulate tunnel excavation, and performing detection by the high-energy accelerator CT detection system in the detection system to realize 3D visible monitoring of the excavation shape of the tunnel model and the fracture strike in the surrounding rock; (2) after the tunnel model is drilled through by the excavation system, simulating a water burst and inrush test in the tunnel, injecting a nuclide solution through the tunnel model solution supply system and setting different pressures through the injection pump to perform incremental simulations on the tunnel model according to the set pressure levels, further obtaining the direction of the solution in the fractures of the tunnel surrounding rock through the detection of the PET detection system in the detection system, and obtaining accurate simulation test data through the destruction of the fractures in the surrounding rock by the solution at different pressures and the position and time of the water inrush occurring in the fractures under the corresponding pressures; and (3) simulating a water burst and inrush test during an excavation process, and acquiring influences of the different fluid pressures on the fractures in the tunnel surrounding rock during the excavation process through the detection system, that is, injecting a solution under the different pressures during the excavation process to acquire reliable parameters corresponding to the development and propagation process of the fractures to provide valuable test parameters for the construction, so as to reduce construction risks.

Further, the tunnel model solution supply system provided above the tunnel model box can simulate the influence of rainfall in a real rainy season on the through tunnel model. After the tunnel is drilled, the 3D shape of the interior of the tunnel model is obtained through the detection system. Rainfalls corresponding to different pressures controlled by the injection pump are simulated to obtain the corresponding damage to the surrounding rock in the tunnel under real pressures, so as to provide reliable data for the construction to reduce the risk of causing debris flows in water inrushes in the fluid-structure interaction tunnel while improving operational safety.

Further, in the present invention, the tunnel solution supply system may also be provided under the fluid-structure interaction tunnel model to simulate an underground river in the construction process. During the excavation process, the high-energy accelerator CT detection system is configured to detect the formation shape of the tunnel and the development and propagation process of the fractures in the surrounding rock inside the tunnel model to obtain the formation range of the fractures under corresponding drilling parameters, and further obtain the construction parameters that cause a water inrush in the underground river at a set distance. Further, the underground river with a certain pressure or the underground river at different distances from the drilling position is simulated by the solution supply system to obtain parameters corresponding to the actual excavation. Further, through the parameter coupling or parameter simulation in a neural network, an accurate peak value of accident occurrence is obtained to provide reliable test data for practical construction.

Although the present invention is described with reference to the preferred embodiments, various modifications may be made to the present invention and the components therein may be replaced with equivalents without departing from the scope of the present invention. In particular, the various technical features mentioned in the various embodiments may be combined in any manner in case of no structural conflict. The present invention is not limited to the specific embodiments disclosed herein, but includes all technical solutions falling within the scope of the claims.

It should be noted that in the description of the present invention, terms such as "central", "upper", "lower", "left", "right", "vertical", "horizontal", "in/inside" and "out/outside" indicate orientation or position relationships based on the drawings, and are merely intended to facilitate description, rather than to indicate or imply that the mentioned device or components must have the specific orientation and must be constructed and operated in the specific orientation. Therefore, these terms should not be construed as a limitation to the present invention. Moreover, the terms "first", "second", "third" and the like are used only for the purpose of description, rather than to indicate or imply relative importance.

It should be noted that in the description of the present invention, unless otherwise clearly specified, the meanings of terms "install/mount", "connect to" and "connection" should be understood in a broad sense. For example, the connection may be a fixed connection, a removable connection, or an integral connection; may be a mechanical connection or an electrical connection; may be a direct connection or an indirect connection via a medium; or may be an internal communication between two components. Those skilled in the art should understand the specific meanings of the above terms in the present invention based on specific situations.

In addition, the term "include/comprise", or any other variations thereof are intended to cover non-exclusive inclusions, so that a process, an article, or a device/apparatus including a series of elements not only includes those elements, but also includes other elements that are not explicitly listed, or also includes inherent elements of the process, the article or the device/apparatus.

Hereto, the technical solutions of the present invention have been described with reference to the preferred implementations and drawings. Those skilled in the art should easily understand that the scope of protection of the present invention is apparently not limited to these specific implementations. Those skilled in the art can make equivalent changes or substitutions to the relevant technical features without departing from the principles of the present invention, and the technical solutions obtained by these changes or substitutions shall fall within the scope of protection of the present invention.

What is claimed is:

1. A visualization system for simulating an excavation of a fluid-structure interaction tunnel, comprising:
   a fluid-structure interaction tunnel model system, a tunnel model solution supply system, a PET detection system and an excavation system;
   wherein
   the tunnel model solution supply system is provided above the fluid-structure interaction tunnel model system, and the tunnel model solution supply system is configured to inject a nuclide solution to simulate a fluid pressure on a tunnel model;
   the PET detection system comprises a computerized tomography (CT) ray system, a CT detection system, a first positron emission tomography (PET) detector and a second PET detector; wherein
   the CT ray system and the CT detection system are provided on a first side and a second side of the fluid-structure interaction tunnel model system, respectively, and the CT ray system and the CT detection system are configured to detect a three-dimensional (3D) deformation state of a surrounding rock of a tunnel;
   the first PET detector and the second PET detector are provided on a third side and a fourth side of the fluid-structure interaction tunnel model system, respectively, and the first PET detector and the second PET detector are configured to detect a 3D migration state of the nuclide solution in the tunnel model;

the excavation system is provided between the CT ray system and the fluid-structure interaction tunnel model system to simulate an excavation of the tunnel model;
the excavation system comprises a drilling device, a moving device, a first carrying device and a lifting device; wherein
the moving device is connected to the drilling device through a first guide rail slider, and the moving device is configured to drive the drilling device to approach or move away from the fluid-structure interaction tunnel model system;
the lifting device is movable relative to the first carrying device, and
the lifting device is configured to drive the first carrying device, the moving device and the drilling device to ascend or descend.

2. The visualization system according to claim 1, wherein the fluid-structure interaction tunnel model system comprises a fluid-structure interaction tunnel model receiving device and a loading device; wherein
the loading device is fixedly provided on a carrying structure on the fluid-structure interaction tunnel model receiving device, and
the loading device is configured to apply a load to the tunnel model to simulate an overburden stress on the tunnel model in a real environment; and
the fluid-structure interaction tunnel model receiving device is provided with two through holes adapted to the drilling device for drilling of the drilling device.

3. The visualization system according to claim 2, wherein a pressure-bearing guide plate and a seepage permeable plate are further provided between the loading device and the tunnel model;
the seepage permeable plate is provided beneath the pressure-bearing guide plate, and the seepage permeable plate is configured for allowing a uniform seepage of the nuclide solution injected into the pressure-bearing guide plate;
the pressure-bearing guide plate comprises a plate-shaped body, a guide hole and guide grooves; wherein
the guide hole is provided through a center of the plate-shaped body;
the guide grooves are provided on a bottom surface of the plate-shaped body to guide the nuclide solution injected into the guide hole;
the guide grooves comprise a circumferential guide groove and a radial guide groove; wherein
the circumferential guide groove is provided on a peripheral side of the guide hole;
the radial guide groove is provided between the circumferential guide groove and the guide hole, and
the radial guide groove is configured to establish a fluid communication between the circumferential guide groove and the guide hole.

4. The visualization system according to claim 2, wherein the tunnel model solution supply system comprises a PET nuclide solution injection pump, a PET nuclide solution storage vessel and a PET nuclide solution injection tube; wherein
the PET nuclide solution injection pump and the PET nuclide solution storage vessel are provided on the carrying structure; and
the PET nuclide solution injection tube is driven by the PET nuclide solution injection pump to deliver the nuclide solution into the tunnel model.

5. The visualization system according to claim 4, wherein the PET detection system further comprises a first PET detector moving device, a first PET detector supporting device, a second PET detector moving device and a second PET detector supporting device; wherein
the first PET detector and the second PET detector are fixed to the first PET detector moving device and the second PET detector moving device, respectively;
the first PET detector moving device and the second PET detector moving device are connected to the first PET detector supporting device and the second PET detector supporting device through a second guide rail slider, respectively; and
the first PET detector moving device and the second PET detector moving device are configured to respectively drive the first PET detector and the second PET detector to approach or move away from the fluid-structure interaction tunnel model system.

6. The visualization system according to claim 1, wherein the drilling device comprises a drilling driving device, a drilling cutter head, an outer chamber, a screw conveyor shaft and a pressure sensor; wherein
the drilling cutter head and the outer chamber are sequentially sleeved outside the screw conveyor shaft;
the pressure sensor is provided at one end of the screw conveyor shaft away from the drilling driving device to monitor a thrust force of drilling in real time; and
a power output end of the drilling driving device is fixedly connected to the screw conveyor shaft to control a drilling process.

7. The visualization system according to claim 6, wherein the moving device comprises a moving driving device, a transmission device and a transmission screw; wherein
a power output end of the moving driving device is fixedly connected to a power input end of the transmission device;
a power input end of the transmission screw is fixedly connected to a power output end of the transmission device;
one end of the transmission screw away from the moving driving device is provided on the first carrying device through a screw support structure; and
the moving device drives the drilling device to advance or retreat through the transmission screw.

8. The visualization system according to claim 1, wherein the lifting device is a hydraulic prop.

9. The visualization system according to claim 8, further comprising:
a rotary carrying device; wherein
the rotary carrying device comprises a rotating device and a second carrying device;
the rotating device is provided above the second carrying device, and
the rotating device is configured to carry and drive the fluid-structure interaction tunnel model system to rotate.

10. The visualization system according to claim 9, wherein
the rotating device is a rotating table.

11. The visualization system according to claim 2, wherein
the lifting device is a hydraulic prop.

12. The visualization system according to claim 3, wherein
the lifting device is a hydraulic prop.

13. The visualization system according to claim 4, wherein
the lifting device is a hydraulic prop.

14. The visualization system according to claim 5, wherein
the lifting device is a hydraulic prop.

15. The visualization system according to claim 6, wherein
the lifting device is a hydraulic prop.

16. The visualization system according to claim 7, wherein
the lifting device is a hydraulic prop.

17. The visualization system according to claim 11, further comprising:
a rotary carrying device; wherein
the rotary carrying device comprises a rotating device and a second carrying device;
the rotating device is provided above the second carrying device, and
the rotating device is configured to carry and drive the fluid-structure interaction tunnel model system to rotate.

18. The visualization system according to claim 12, further comprising:
a rotary carrying device; wherein
the rotary carrying device comprises a rotating device and a second carrying device;
the rotating device is provided above the second carrying device, and
the rotating device is configured to carry and drive the fluid-structure interaction tunnel model system to rotate.

19. The visualization system according to claim 13, further comprising:
a rotary carrying device; wherein
the rotary carrying device comprises a rotating device and a second carrying device;
the rotating device is provided above the second carrying device, and
the rotating device is configured to carry and drive the fluid-structure interaction tunnel model system to rotate.

20. The visualization system according to claim 14, further comprising:
a rotary carrying device; wherein
the rotary carrying device comprises a rotating device and a second carrying device;
the rotating device is provided above the second carrying device, and
the rotating device is configured to carry and drive the fluid-structure interaction tunnel model system to rotate.

* * * * *